United States Patent [19]

Maruyama et al.

[11] Patent Number: 4,729,527
[45] Date of Patent: Mar. 8, 1988

[54] SLIDE SWITCH OF ANTI-REVERSE MECHANISM FOR FISHING REEL

[75] Inventors: Kenji Maruyama; Toshiaki Yorikane, both of Hiroshima, Japan

[73] Assignee: Ryobi, Ltd., Hiroshima, Japan

[21] Appl. No.: 937,398

[22] Filed: Dec. 3, 1986

[30] Foreign Application Priority Data

Dec. 5, 1985 [JP] Japan .............................. 60-188207[U]

[51] Int. Cl.[4] .............................................. A01K 89/01
[52] U.S. Cl. .......................... 242/84.1 R; 242/84.5 A
[58] Field of Search .................... 242/84.1 R, 84.2 R, 242/84.2 A, 84.21 A, 84.5 A, 84.51 A

[56] References Cited

U.S. PATENT DOCUMENTS

| | | | |
|---|---|---|---|
| 3,499,613 | 3/1970 | Sarah | 242/84.21 R |
| 3,946,963 | 3/1976 | Oberg | 242/84.21 R |
| 4,196,868 | 4/1980 | Puryear et al. | 242/84.21 R |

FOREIGN PATENT DOCUMENTS 57-132826  8/1982  Japan .
57-183869 11/1982  Japan .
59-107870  7/1984  Japan .

*Primary Examiner*—Billy S. Taylor
*Attorney, Agent, or Firm*—Finnegan, Henderson, Farabow, Garrett, and Dunner

[57] ABSTRACT

An improved anti-reverse slide switch for a fishing reel is disclosed. The fishing reel includes a rotor, a spool, reel housing, anti-reverse pawl, and anti-reverse gear. The mechanism includes a slide button and a leaf spring. The slide button comprises an exterior control knob, an internal frame portion, an operation arm adapted to actuate the anti-reverse pawl, and a neck portion. The operation arm extends from one side of the internal frame portion, and the neck connects the exterior control knob and the internal frame portion. The neck slidingly engages an opening formed in the reel casing. The leaf spring includes a main body formed with a recessed portion, a projection and a holding means. The projection is positioned at the main body and is engageable and disengageable with respect to a protrusion formed at an inner surface of the reel casing. The recessed portion is fitted with the neck portion, and the holding means has a U-shape portion extending from one side of the main body. The holding means holds the lower end portion of the slide button.

3 Claims, 6 Drawing Figures

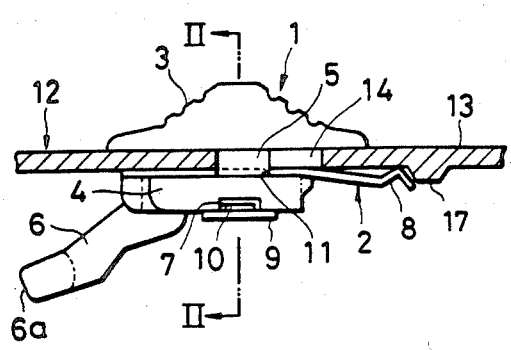
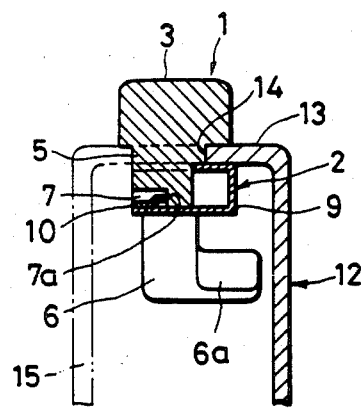
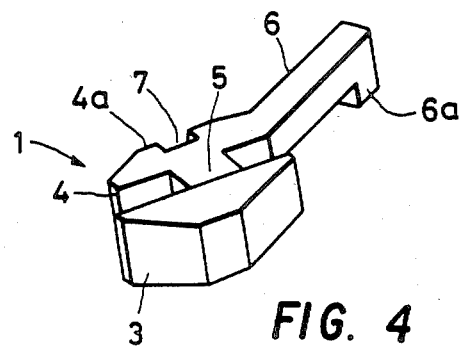
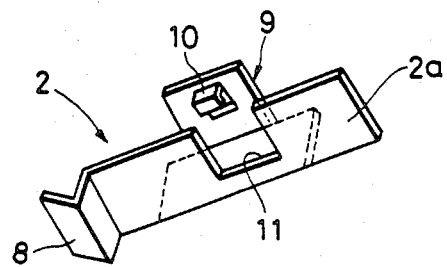
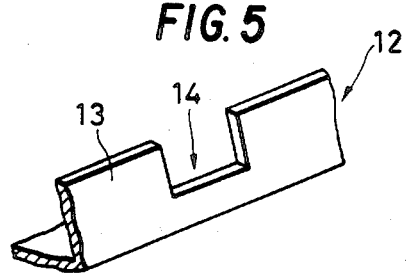

SLIDE SWITCH OF ANTI-REVERSE MECHANISM FOR FISHING REEL

BACKGROUND OF THE INVENTION

The present invention relates to an anti-reverse slide switch fitted to a reel casing and used as a switching mechanism for preventing a rotary means such as a rotor and a spool for a fishing reel from counter rotation.

Various mechanism have been proposed heretofore to prevent rotary means such as rotor from counter rotation. According to one known arrangement disclosed in Japanese patent application early publication No. 132826/82, for instance, a leaf spring adjusting member is fixed with a pin having a head, and the pin having a head is arranged so that the head may be locked with respect to a control knob when the pin is revolved by up to 90 degrees relative to its assembling position. Therefore, assembling work is troublesome. Another known mechanism disclosed in Japanese patent application early publication No. 183869/82 is to equip a slider wherein a mating spring means is provided integral with a synthetic resin member and therefore, biasing force of the mating spring means tends to become poor, so that switching operation would not be made with clear switching feeling.

Still another known mechanism disclosed in Japanese patent application early publication No. 107870/84 comprises a knob member and a leaf spring. The knob member includes a knob, and a splice plate coupled in parallel with each other by a neck, and the splice plate has an arm. The leaf spring includes a U-shape cutout, a mating projection and a bent holding piece. The above neck is fitted into the cutout so that the leaf spring is superposed on the splice plate. The neck of the knob member is slidably fitted into a U-shape cutout formed in the periphery of a reel casing. A lid member is provided to the reel casing to prevent the knob member from falling out of the reel casing. Consequently, not only the feeling of settled switching but also the ease of assembly is ensured to a greater degree than those in the above two known arrangements. However, the disadvantage is that, because the knob member and the reel casing as well as the leaf spring are assembled together by fitting the neck with the cutout, and the knob member is merely supported by the lid, the structure is easily disassembled upon removal of the lid. Further, the knob member and other members are not readily assembled in the reel casing due to oscillation and due to the easily disconnecting arrangement from one another.

SUMMARY OF THE INVENTION

The present invention is intended for the solution of the abovementioned problems, and it is therefore an object of the invention to provide an improved anti-reverse slide switch for a fishing reel. According to the present invention, a leaf spring is provided with a holding means having U-shape in transverse cross-section to which an internal frame portion of control means or a slide button is held, to thereby integrally couple the slide button and the leaf spring, whereby assembling work is easily carried out without the inadvertent release of the leaf spring from the button.

More specifically, an anti-reverse switch according to the present invention comprises a slide button and a leaf spring. The slide button is disposed in an opening formed at a peripheral portion of a reel casing, and the slide button includes an exterior control knob, an internal frame portion, an operation arm and a neck portion. The internal frame portion is disposed inside the reel casing, and the operation arm is adapted to actuate an anti-reverse pawl and extends from one side of the internal frame portion. The neck portion connects the exterior control knob and the internal frame portion. The neck portion is slidaby engageable with the opening of the reel casing. The leaf spring includes a main body, a projection, a recessed portion and a holding means. The projection is disposed in the main body, and is engageable and disengageable with respect to a protrusion formed at the inner peripheral surface of the reel casing. The recessed portion is fitted with the neck portion. The holding means is provided with a U-shape member and extends from one side of the main body. The holding mean holds the internal frame portion of the slide button.

BRIEF DESCRIPTION OF THE DRAWINGS

In the drawings;

FIG. 1 is a vertical sectional view of an anti-reverse slide switch of embodying the present invention for use in a fishing reel;

FIG. 2 is a sectional view taken along a line II—II of FIG. 1;

FIG. 3 is an exploded perspective view of the control means of the anti-reverse switch; and FIG. 4 is an exploded perspective view of the leaf spring means showing the mating projection and U-shape holding means;

FIG. 5 is an exploded perspective view of the reel casing and the aperture.

DETAILED DESCRIPTION OF THE PREFERRED EMBODIMENTS

Figure 6:
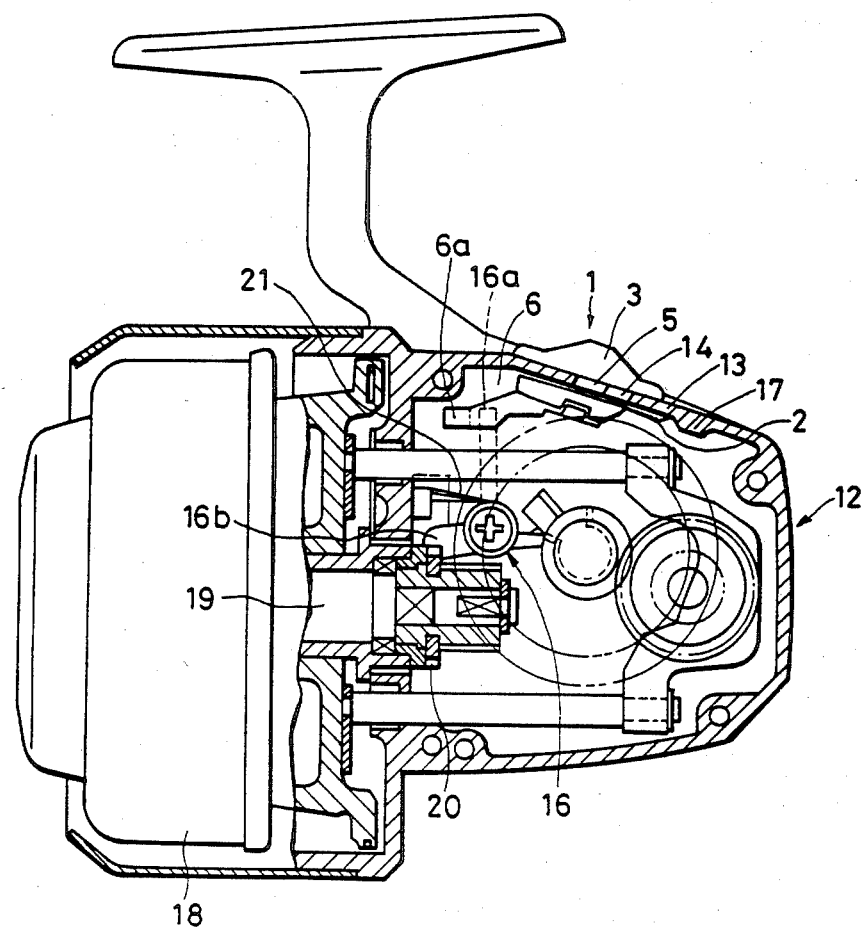
FIG. 6 is a side view partially sectioned showing a fishing reel incorporating a slide switch mechanism according to the present invention.

Referring now to the accompanying drawings, an embodiment of the present invention will be described in detail. As shown in FIGS. 1 through 6, an anti-reverse slide switch comprises a slide button or control means 1, and a leaf spring 2. The slide button 1 includes a control knob 3, a lower end or internal frame portion 4, a square neck 5 connecting the knob 3 and the lower end portion 4, and an operating arm 6 extending from one side of the lower end portion 4 and tilting downwardly. The arm 6 is provided with a bent operating portion 6a at its front end. The operating portion 6a is adapted to actuate an anti-reverse pawl as described later.

The lower end portion 4 has a bottom surface 4a by which a holding means (described later) of the leaf spring 2 is stably secured. Therefore, at least the central portion of the bottom surface 4a is formed flat. Further, at one side of the central portion of the bottom surface 4a, formed is a generally U-shape recessed portion 7 to engage the leaf spring 2.

The leaf spring 2 includes a strip-like body or outer plate 2a, a projection or mating arm 8 formed by bending the front end of the body in the form of an inverted V shape, the projection 8 being made to frictionally engage a protrusion of a reel casing as described later. A U-shape holding means 9 is bent down in a direction roughly perpendicular to one side of the body 2a with the free end thereof being so bent in parallel to the body 2a as to hold the lower end portion 4 of the slide button 1. A projection 10 projects from the inner part of the almost front end of the holding means so that the projection 10 can mate with the recess 7 of the slide button 1. In approximately the central portion of the body 2a, provided is a U-shape cutout 11 in horizontal cross-section which is capable of fitting with the neck 5 of the slide button 1.

The projection 10 may be formed by punching the almost front end of the holding means 9 by a punching device, or by raising up a U-shape cut portion formed in the front end. In either case, however, the projection 10 must be formed inwardly and be able to readily mate with the recess 7. In this case, the free end of the projection 10 is in engagement with a side wall 7a of the recess 7 as shown in FIG. 2, and disassembly between the recess and the projection is prevented.

In the above embodiment, the leaf spring 2 is held on the slide button 1 by mating the projection 10 provided in the holding means 9 of the leaf spring 2 with the recess 7 provided in the lower end portion of the slide button 1. However, the recess may be formed in the inside of and in proximity to the front end of the holding means 9 of the leaf spring 2, and projection may be provided on the bottom 4a of the lower end portion 4 of the slide button 1. The latter structure is not shown in the drawing.

Moreover, a space between the body 2a of the leaf spring 2 and the front end of the holding means 9 may be narrower than the vertical thickness of the lower end portion 4 of the slide button 1 without installing the mating recess and the projection so as to hold the leaf spring 2 on the slide button by clamping the lower end portion 4 with the body 2a and the front end of the holding means 9 by means of the biasing force of the leaf spring itself.

When these parts are incorporated in the reel casing 12, the leaf spring 2 is laterally forced to engage the slide button 1 when the neck 5 and the cutout 11 are placed in position. As the projection 10 is caused to abut against and is guided by the bottom 4a of the lower end portion 4 of the slide button 1, the holding means 9 expands against its own biasing action, so that both of them are mated with each other. When the neck 5 has mated with the cutout 11, the holding means restores its original shape by its biasing force, thus causing the projection 10 to mate with the recess 7, and the lower end portion 4 is interposed between the main body 2a and the tip end of the holding means 9. Subsequently, the neck 5 is made to mate with the U-shape cutout 14 bored in the periphery 13 of the reel casing 12. In this csae, the periphery 13 is positioned between the knob 3 and the leaf spring 2.

The slide button 1 and the leaf spring 2 are fitted in the reel casing 12 and thus made slidable within a range of the effective stroke of the cutout 14, and the assembling process is completed by fixing a lid 15 to the reel casing 12 with screws and closing the opening of the cutout 14.

Needless to say, during the above assembling process, the operating portion 6a of the operating arm 6 of the slide button 1 is so related with a lever 16a of an anti-reverse pawl 16 pivotally mounted on the reel casing 12 that the operating portion can operate the lever 16a, and the mating projection 8 of the leaf spring is also so related with the projeciton 17 provided at inside of the periphery 17 of the reel casing that the projection 8 is disengageable with respect to the projection 17.

The pawl 16b of the anti-reverse pawl 16 is urged to engage an anti-reverse gear 20 fixed to a rotary shaft 19 of a rotor 18. The gear 20 is rotatable together with a rotor 18 of the reel device. The anti-reverse pawl 16 is released by the operating arm 6 from being stopped in the state shown in FIG. 4 wherein the projection 8 of the leaf spring 2 has been caused to ride over the projection 17 of the reel casing by sliding the slide button 1 forward in a second position. The pawl 16b is thereby allowed to engage the gear 20, whereas the rotor 18 is held in the anti-reverse position.

The anti-reverse pawl 16 is rotated by the operating arm 6 pulling against the biasing force of the spring by sliding the slide button 1 back from the position shown in FIG. 4 into a first position allowing the rotor 18 to be rotated reversely when the pawl 16b is disengaged from the gear 20. At this time, the projection 8 of the leaf spring 2 is caused to ride over the projection 17, whereby the slide button 1 is held in the switching position. When the projection 8 of the leaf spring 2 rides over the projection 17, the feeling of settled switching is obtainable.

In the anti-reverse slide switch for a fishing reel thus constructed according to the present invention, the leaf spring 2 for obtaining the feeling of settled switching is formed with the U-shape holding means 9, and while the neck 5 of the slide button 1 is fitted with the cutout 11 of the leaf spring 2, the lower end portion 4 of the slide button 1 is clamped with the holding means 9. Further, the leaf spring 2 is held on the slide button 1 by interposing the lower end portion 4 between the main body 2a and the tip end of the holding means 9, or by causing the locking projection 10 provided at one of the holding means 9 and the lower end portion 4 to be matingly engaged within the mating recess 7 provided at the intersecting of elements 4 and 9. Therefore, these members 1 and 2 are securely attached without possibility of being shaken or drifted away, so that the leaf spring 2 is prevented from falling off at the time of switching. Since the leaf spring 2 is surely fixed to the slide button 1, sufficient original biasing force of the spring makes it possible to provide the feeling of settled switching. Furthermore, members 1 and 2 can be easily assembled to the reel casing in such a manner that the slide button 1 and leaf spring 2 are initially coupled with each other.

What is claimed is:

1. A switch mechanism in a fishing reel for controlling reverse rotation of a rotor, comprising:
   a casing for the fishing reel, said casing having an aperture and a projection extending along an inner surface of said casing proximate said aperture;
   pawl means disposed within said casing for normally engaging the rotor to prevent reverse rotation thereof;
   control means extending through said aperture and slidably aligned in first and second positions for disengaging said pawl means from said rotor in said first position and for returning said pawl means into engagement with said rotor when said control means shifted to said second position, said control means including a control knob disposed along an exterior portion of said casing, a neck portion integrally connected at a first end to said control knob and aligned within said aperture, an internal frame portion integrally connected to a second end of said neck portion and slidably positioned along said inner surface, and an operating arm extending from said internal frame portion for engagement with said pawl means;

leaf spring means for clamping said internal frame portion and for selectively holding said control means in said first and second positions, said leaf spring means including an outer plate having a cutout section for receiving said neck portion, said leaf spring means also including a clamping arm extending from said outer plate and sized to clamp said internal frame portion therebetween, said leaf spring means further including a mating arm disposed along an edge of said outer plate to urge said outer plate into frictional engagement with said inner surface of said casing along said aperture, said mating arm being aligned with a first surface of said projection nearest said aperture to hold said control means in said second position, said mating arm also being urged into alignment with a second surface of said projection opposite said first surface to hold said control means when said control means is in said first position; and engagement means for locking said clamping arm into said internal frame portion.

2. The switch mechanism as defined in claim 1, wherein said engagement means includes a recess formed in said internal frame portion and a lock projection formed on said clamping arm, said lock projection being aligned within said recess to lock said leaf spring means onto said control means.

3. The switch mechanism as defined in claim 1, wherein said pawl means includes a pawl lever and said control means includes a bent operating portion for engaging said pawl lever to engage and disengage said pawl means from said rotor.

* * * * *